US008312009B1

(12) United States Patent  
Bostock (10) Patent No.: US 8,312,009 B1  
(45) Date of Patent: Nov. 13, 2012

(54) OBTAINING USER PREFERENCES FOR QUERY RESULTS

(75) Inventor: Michael C. Bostock, San Francisco, CA (US)

(73) Assignee: Google Inc., Mountain View, CA (US)

( * ) Notice: Subject to any disclaimer, the term of this patent is extended or adjusted under 35 U.S.C. 154(b) by 385 days.

(21) Appl. No.: 11/706,105

(22) Filed: Feb. 14, 2007

Related U.S. Application Data

(60) Provisional application No. 60/877,562, filed on Dec. 27, 2006.

(51) Int. Cl.
*G06F 7/00* (2006.01)

(52) U.S. Cl. ........................................ 707/723

(58) Field of Classification Search ............... 707/7, 723
See application file for complete search history.

(56) References Cited

U.S. PATENT DOCUMENTS

| 6,654,742 | B1 * | 11/2003 | Kobayashi et al. ............... 707/7 |
| 2003/0055831 | A1 | 3/2003 | Ryan et al. |
| 2006/0004711 | A1 | 1/2006 | Naam |
| 2006/0074864 | A1 | 4/2006 | Naam et al. |

* cited by examiner

*Primary Examiner* — Etienne Leroux  
*Assistant Examiner* — Ajith Jacob  
(74) *Attorney, Agent, or Firm* — Harrity & Harrity, LLP (57) ABSTRACT

One embodiment of the present invention provides a system that obtains user preferences for query results. First, in response to a query, the system presents a ranked list of query results to a user. The system then receives a request from the user to change the position of a query result in the ranked list of query results. Based on the change in position of the query result, the system infers at least one preference of the user between the query result and other query results in the ranked list.

20 Claims, 7 Drawing Sheets

OBTAINING USER PREFERENCES FOR QUERY RESULTS

RELATED APPLICATION

This application claims priority under 35 U.S.C. section 119(e) to U.S. Provisional Application Ser. No. 60/877,562, entitled "Obtaining User Preferences for Query Results," by the inventor Michael C. Bostock, filed on 27 Dec. 2006, the contents of which are herein incorporated by reference.

BACKGROUND

1. Field of the Invention

The present invention relates to techniques for gathering user preference data. More specifically, the present invention relates to obtaining user preferences for query results by analyzing user interactions with a set of query results.

2. Related Art

The relentless growth of the Internet has been largely fueled by the development of sophisticated search engines, which enable users to comb through billions of web pages looking for specific pages of interest. Because a given query can return millions of search results it is important to be able to rank these search results to present the highest-quality results to the user.

It is extremely difficult if not impossible to measure the quality of results directly. Early techniques for ranking results considered intrinsic properties of each candidate result document, including how recently the document was updated, and/or how close the search terms are to the beginning of the document. Another technique considers an extrinsic property, the back-links for linked documents. However, these techniques are based on properties that are under authorial control, and do not necessarily indicate the direct preferences of users. It is desirable to obtain a more direct measurement of search result quality from users themselves. However, it is difficult to obtain such measurements from users.

Hence, what is needed is a method and an apparatus for accurately ranking search results based on user preferences,

SUMMARY

One embodiment of the present invention provides a system that obtains user preferences for query results. First, in response to a query, the system presents a ranked list of query results to a user. The system then receives a request from the user to change the position of a query result in the ranked list of query results. Based on the change in position of the query result, the system infers at least one preference of the user between the query result and other query results in the ranked list.

In a variation on this embodiment, the change of position defines a partial ordering for the ranked list of query results.

In a variation on this embodiment, the system records user preferences on a per-user and/or per-query basis.

In a further variation, the system uses the recorded user preferences to rank future query results.

In a further variation, information describing the position change request is sent to a server.

In a variation on this embodiment, the position change request is a command received from the user to change the position of a graphical icon representing the query result in a ranked list of graphical icons representing query results. In a further variation, this command is received via a pointing device, such as a mouse.

In a variation on this embodiment, the system aggregates user preferences for one or more users and/or queries.

In a further variation, the system gathers and aggregates user preferences to determine rules for ranking query results.

In a variation on this embodiment, the system dynamically reorders the ranked list of query results based on the position change request.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling Ranking and Searching Processes

Figure 1:
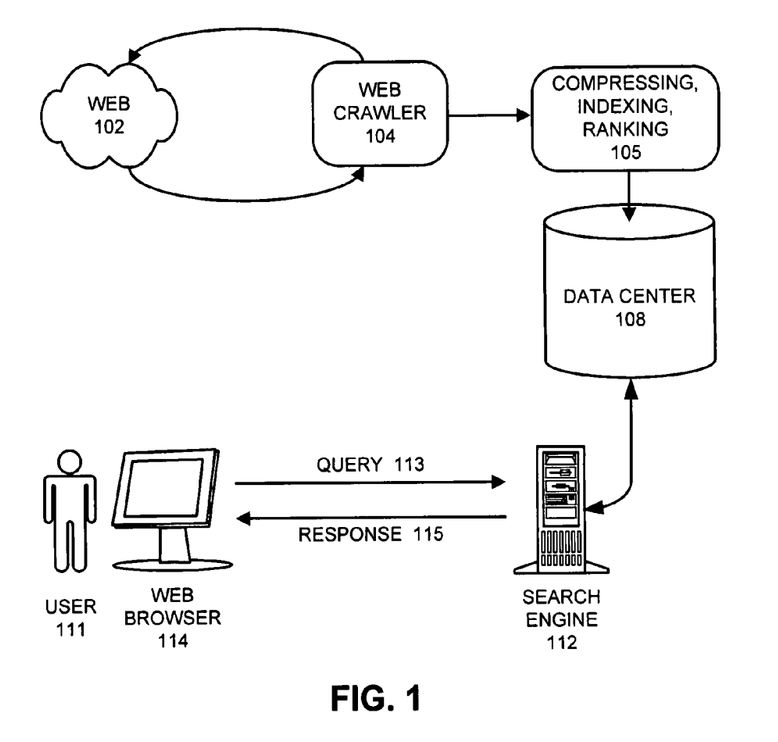
FIG. 1 illustrates the crawling, ranking and searching processes in accordance with an embodiment of the present invention.

FIG. 1 illustrates the crawling, ranking and searching processes. During the crawling process, a web crawler 104 crawls or otherwise searches through websites on web 102 to select web pages to be stored in indexed form in data center 108. The selected web pages are then compressed, indexed and ranked in module 105 (using the ranking process described above) before being stored in data center 108.

During a subsequent search process, a search engine 112 receives a query 113 from a user 111 through a web browser 114. This query 113 specifies a number of terms to be searched for in the set of documents. In response to query 113, search engine 112 uses search terms specified in the query to identify highly-ranked documents that satisfy the query. Search engine 112 then returns a response 115 through web browser 114, wherein the response 115 includes a list of matching pages along with ranking information and references to the identified pages.

Figure 2A:
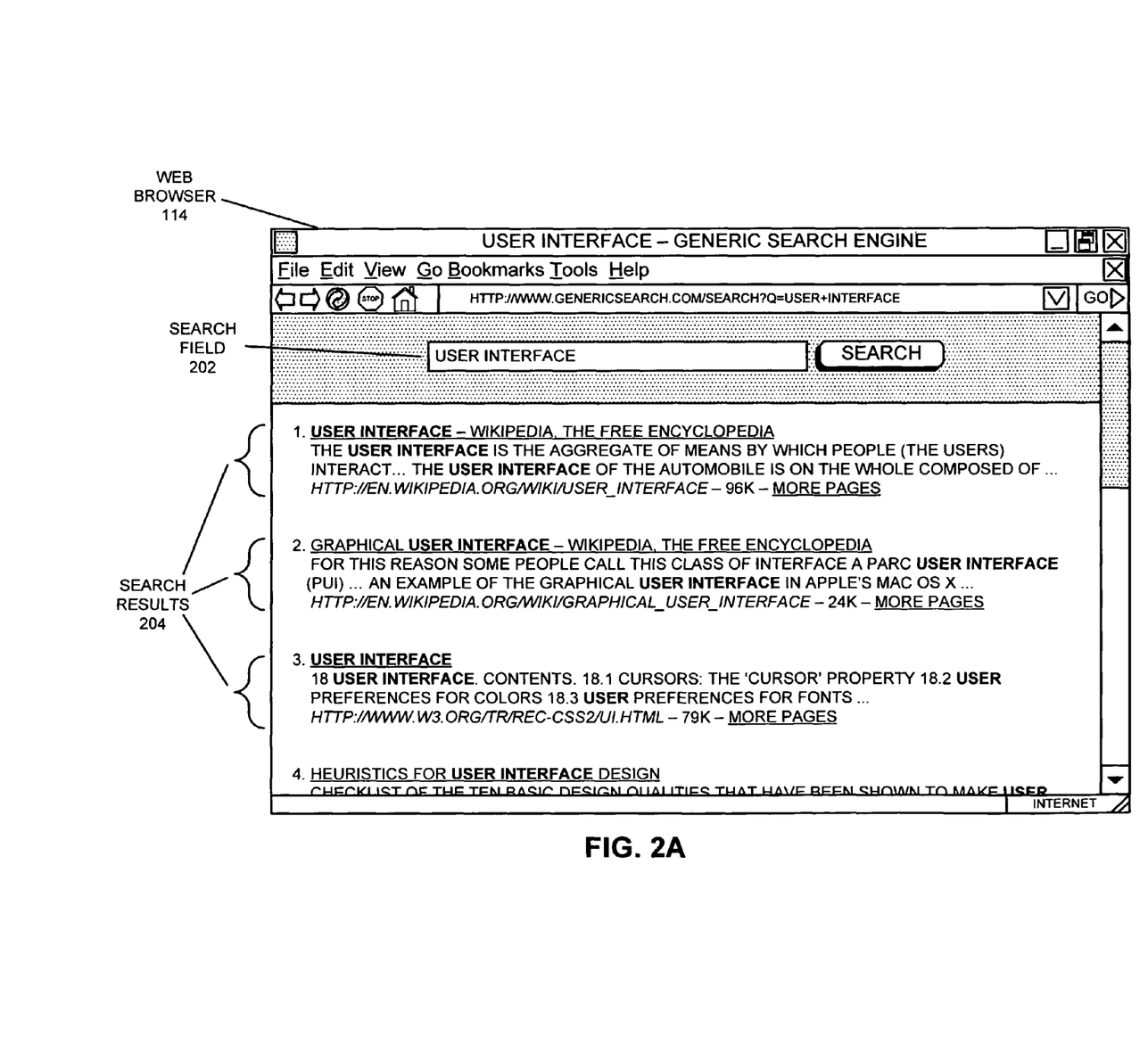
FIG. 2A illustrates a web page that displays a search field and search results in accordance with an embodiment of the present invention.

FIG. 2A illustrates a web page that displays a search field 202 and search results 204 in web browser 114. After a user enters one or more search terms into search field 202 (e.g. suppose the user enters the query "user interface" in search field 202), the system performs a search operation and displays the list of search results 204 for the query. The user can then browse through the search results 204 to determine whether or not they include the desired information.

Gathering User Preferences Via Reordered Search Results

One embodiment of the present invention provides a system that allows users to reorder search results, and gathers user preference data based on the users' reordering of search results. Gathering such preference data directly from users, when possible, can provide more accurate preference data than other approaches, such as predicting user preferences based on the content of selected pages.

Figure 2B:
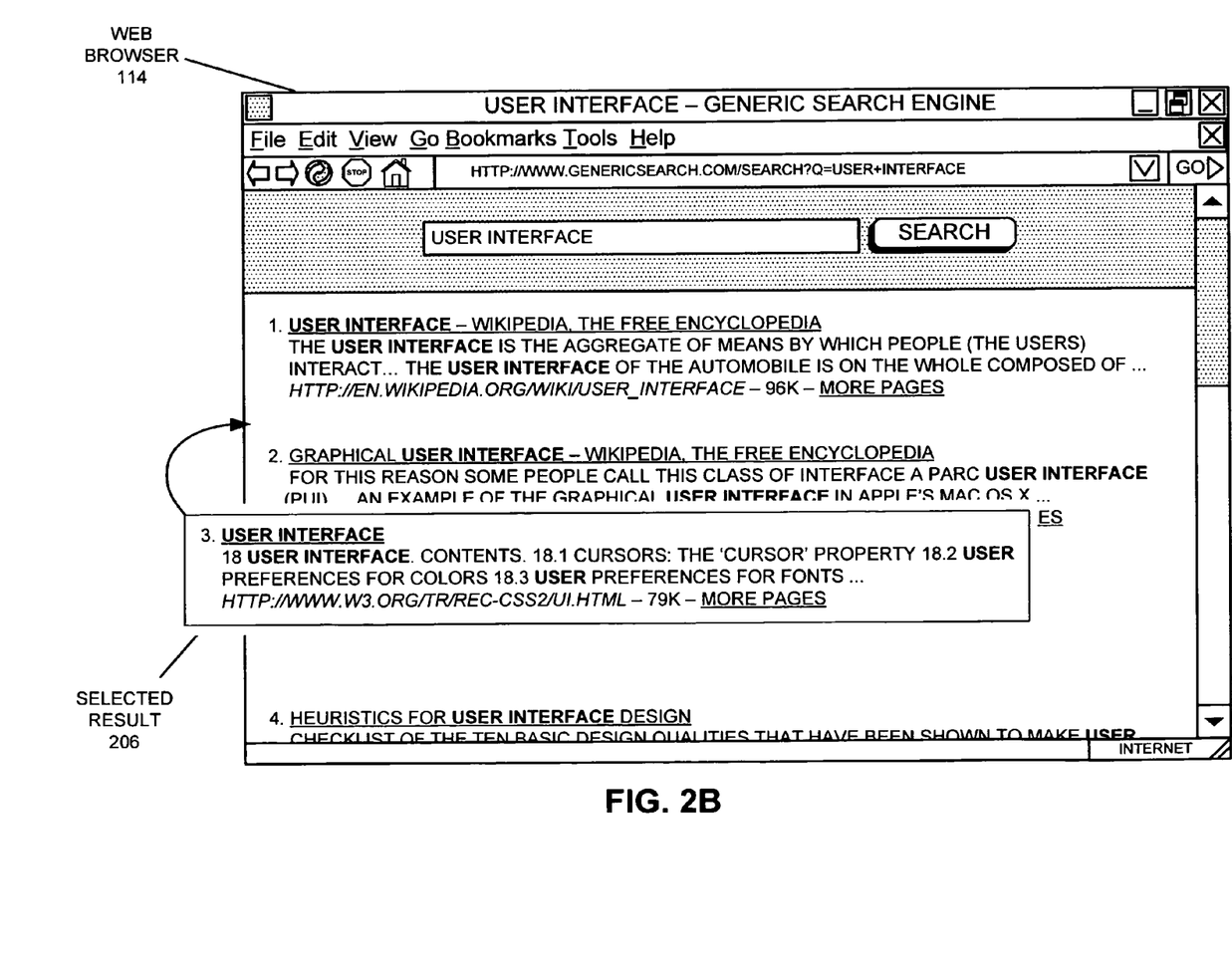
FIG. 2B illustrates the process of reordering a search result in a web page in accordance with an embodiment of the present invention.
Figure 2C:
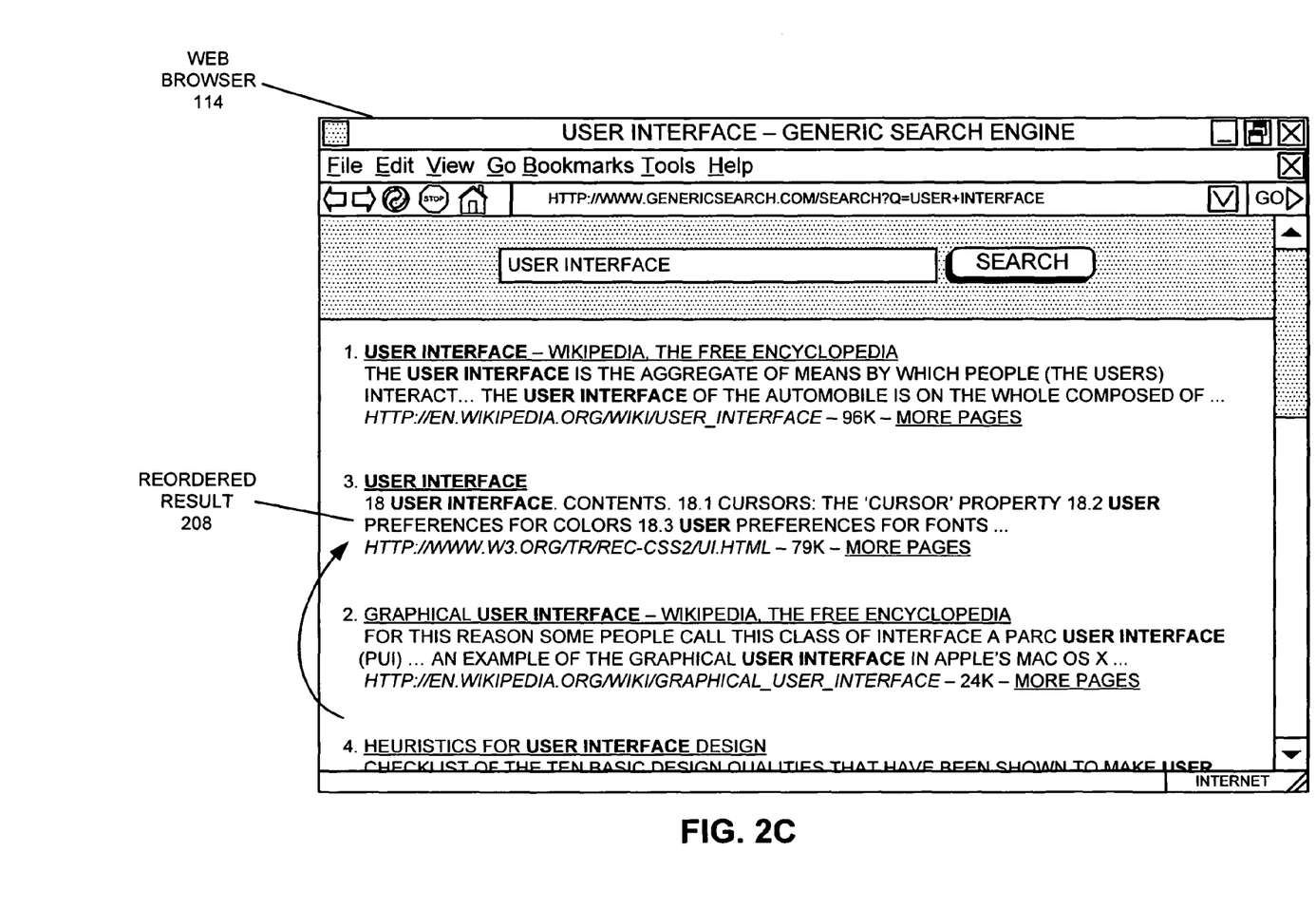
FIG. 2C illustrates a reordered result in an updated list of search results in accordance with an embodiment of the present invention.

FIG. 2B illustrates the process of reordering a search result in a web page. During this process, a user can, for instance, select a search result using a mouse, and can then drag the selected result 206 up or down in the list of search results. FIG. 2C illustrates the reordered result 208 in the updated list of search results. By re-ordering results, a user provides constrained input about whether a certain result is better and/or worse than one or more other results. Note that reordering a search result does not necessarily imply that the user has visited the page for the search result. For instance, the user may have decided to reorder search results before visiting them based on the information presented in the list (such as a universal resource locator (URL) or a representative data snippet displayed in the list).

In one embodiment of the present invention, the system records partial orderings based on reordered search results to improve rankings which are used to generate personalized search results. A partial ordering is an ordering relation for a set that specifies a preferred precedence for some pairs of items in the set, but might not specify the preferred precedence for all pairs in the set. The system can determine a partial ordering from both direct and implied preferences indicated by user reorderings.

Figure 3A:
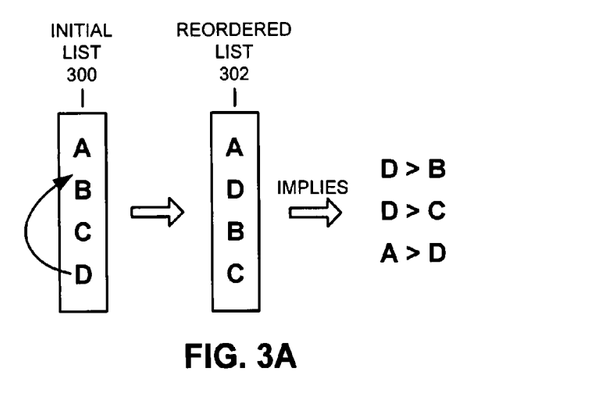
FIG. 3A illustrates partial orderings that result when a list is reordered in accordance with an embodiment of the present invention.

FIG. 3A illustrates a partial ordering that is created when a result in an initial list 300 is reordered, thereby forming a reordered list 302. For instance, by moving the item 'D' up in the initial list 300, a user implies that 'D' is more relevant than both 'B' and 'C'. This reordering also strongly implies that 'A' is more relevant than 'D', since if the reverse were true, the user would have reordered the list placing 'D' above 'A' as well.

Note that the system can also gather preference data implied by results that are not reordered. For instance, for the example in FIG. 3A, reordering 'D' in the list as shown might also imply that a user is satisfied with the existing ordering of 'A', 'B', and 'C'. However, because this is a passive observation rather than an active reflection of user preferences, the system may weigh such implied preferences more lightly than explicit user preferences (such as those described in relation to 'D' in this example).

Note also that reordering a search result is a stronger statement of preference than selecting ("clicking") a result in a list of search results. For example, a user may not see a page without clicking on it, and so a click does not necessarily correspond to a good result. While selecting a search result, a user may not know the content of the result, and might merely be selecting the result in order to evaluate the contents of the result. Hence, passive observation techniques such as click-tracking are noisy and often difficult to interpret. A reordering operation, on the other hand, is more likely to indicate that a user prefers one result more or less than other results, and hence directly indicates preferences between search results.

Figure 3B:
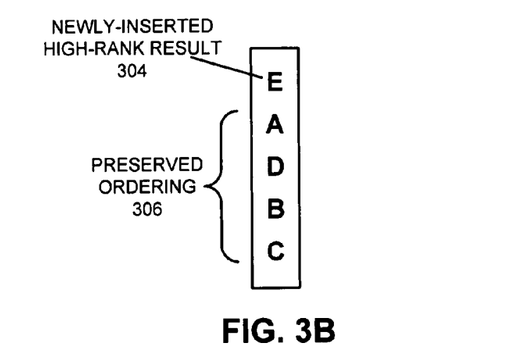
FIG. 3B illustrates a new result which is inserted into a reordered list of search results in accordance with an embodiment of the present invention.
Figure 3C:
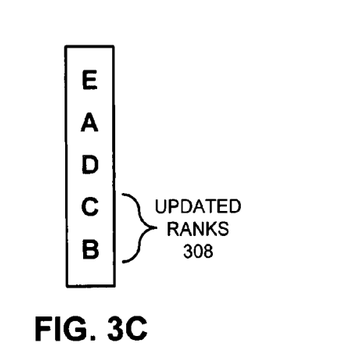
FIG. 3C illustrates a changed ranking for two search results in a reordered list of search results in accordance with an embodiment of the present invention.

Note also that examining reorderings of search results has benefits over other techniques for gathering user preference data, such as tracking when a user saves, blocks, or marks ("stars") a result. For instance, the system can preserve the specified preferences implied by the reordering while updating search results located above, below, and between the reordered results. For example, if the user performs the same query in a later timeframe, and the system finds a higher-ranked result 304, 'E', the system can insert 'E' at the top of the list of search results while simultaneously preserving the user preference detected from the reordering 306 (as shown in FIG. 3B). Alternatively, if the relative ranks of 'C' and 'B' change, the system can update their rank 308 in the list while maintaining the partial ordering that ranks 'D' higher than both 'C' and 'B' (as shown in FIG. 3C).

A reordering system that directly benefits the user by improving search results is more likely to be used than other direct solicitation techniques, such as satisfaction surveys. The system described in the present invention can also overcome problems with other preference-gathering techniques such as: low response rates; being difficult for users to understand; and being difficult to aggregate into a ranking, because users vary greatly in the degree and direction of their opinions.

Figure 4:
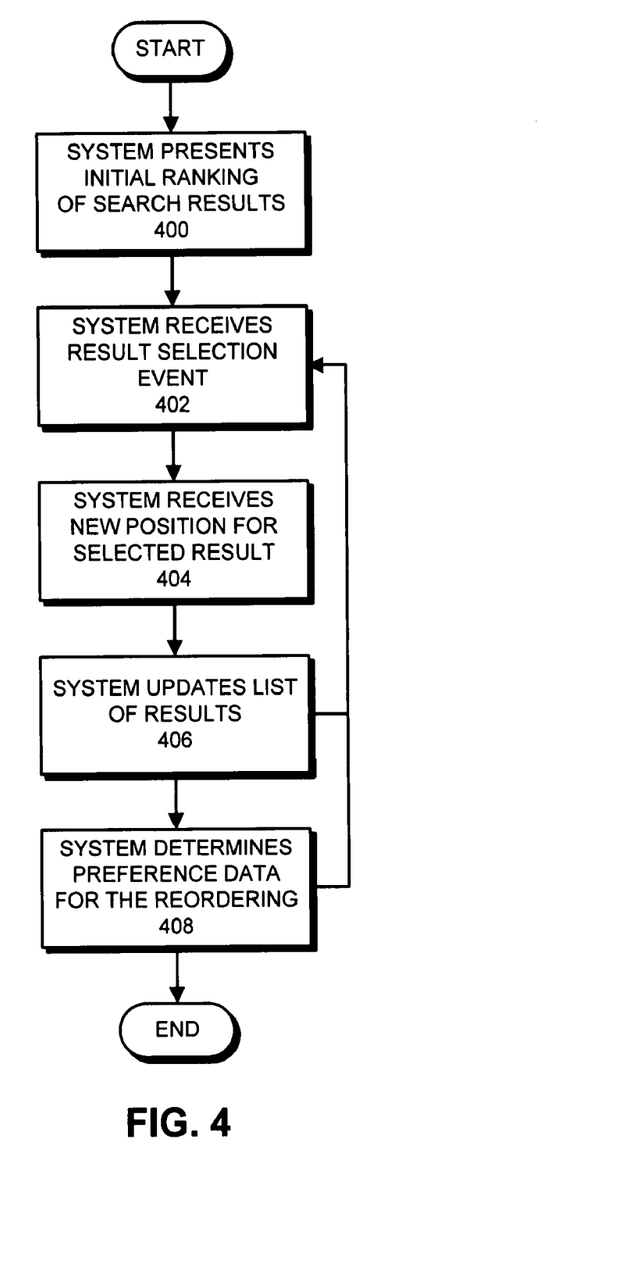
FIG. 4 presents a flow chart illustrating the process of using reordering of search results to obtain user preferences in accordance with an embodiment of the present invention.

FIG. 4 presents a flow chart illustrating the process of using reorderings of search results to obtain user preferences. First, the system presents an initial ranking of search results to a user in response to a query (step 400). Next, the system receives a result selection event from the user (step 402), along with a new position for the selected result (step 404). The system then updates the list of results (step 406), and determines preferences based on the reordering (step 408).

In one embodiment of the present invention, the system typically expects a sequence of reorderings. For instance, rather than moving just a single search result, users may perform a number of reorderings on a given list. Hence, after updating the list of results (step 406) or determining partial preference data for an individual reordering (step 408), the process may include looping back (returning to step 402) to receive and handle one or more additional reorderings. While the system can gather preference data from individual or partial sequences of reorderings, the user's preferences may not be fully known until all of the reorderings are completed. Typically, the more reorderings the system receives, the more confident the system can be in the implied preference data.

In one embodiment of the present invention, preference data is used to evaluate and/or improve the ranking of search results. Ranking systems often use machine-learning techniques to boost search results based on a set of input signals. The system can analyze user preference data to identify signals from web pages that indicate a higher (or lower) page ranking. Any number of signals for web pages can be correlated based on such user preference data, with the system then using such correlations to train a set of machine-learning techniques. For instance, after a user searches for the name of a music artist (e.g., [britney spears]), they might reorder the results so that a result corresponding to an entry in an online, collaborative encyclopedia ranks higher than a result corresponding to an official fan site directly maintained by the artist. Machine-learning techniques can detect patterns and trends based on such reorderings.

Figure 5:
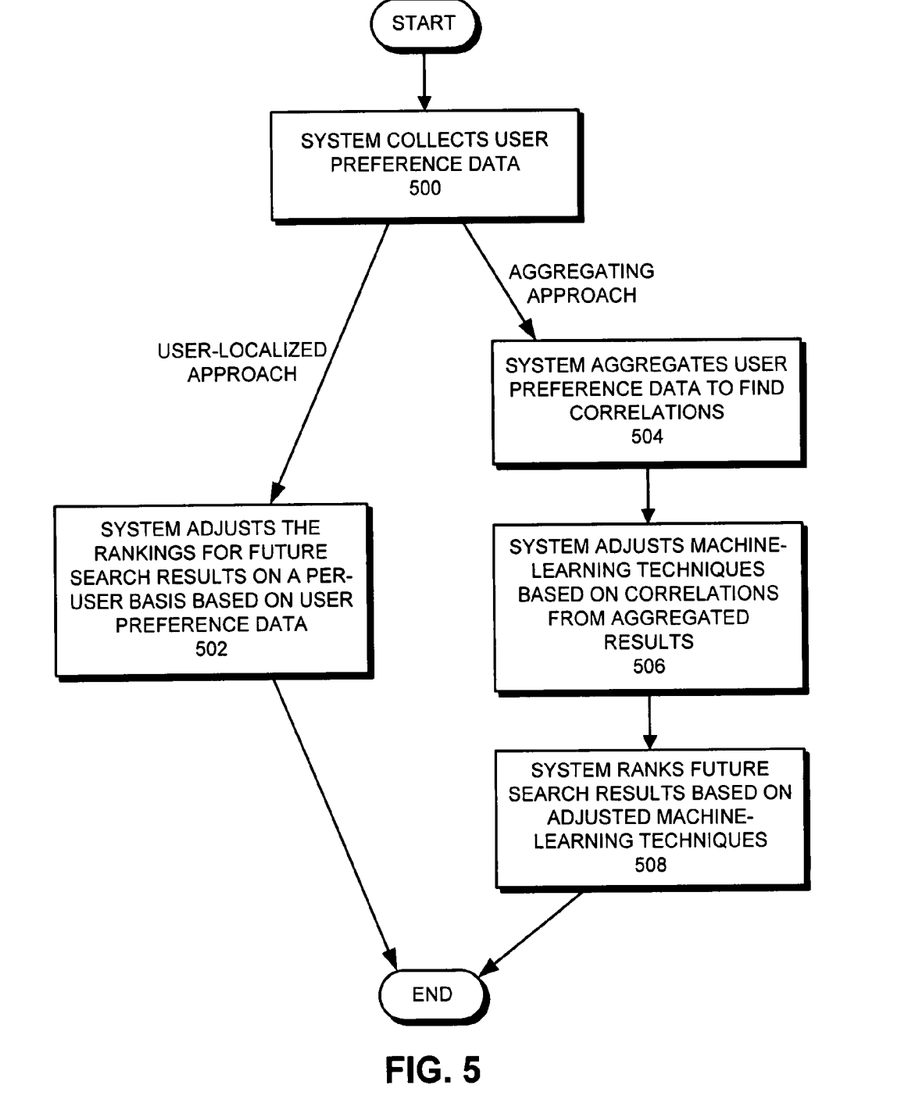
FIG. 5 presents a flow chart illustrating the process of leveraging user preferences to adjust search result rankings in accordance with an embodiment of the present invention.

FIG. 5 presents a flow chart illustrating the process of leveraging user preferences to adjust search result rankings. During operation, the system collects user preference data (step 500). In a user-localized approach, the system may adjust the rankings for future search results on a per-user basis based on the user preference data for each individual user (step 502). Alternatively, in an aggregating approach, the system aggregates user preference data to find correlations (step 504). The system then proceeds to adjust a set of machine-learning techniques based on correlations from these aggregated results (step 506), and then ranks future search results based on these adjusted machine-learning techniques (step 508).

By allowing users to reorder search results, the system in the present invention can collect user preference data from the user population at large, thereby providing a scalable source of training data for machine-learning techniques and improving the ranking of user search results both on an individual and/or aggregate scale. For instance, on the scale of an individual user, the system may keep a set of results fixed (with respect to rankings) for an individual user to maintain preferences specified by that user. Alternatively (e.g. in the previously-mentioned search for the name of a music artist), the preferences of users can be aggregated either within the context of the original query, or across queries. For example, if users often reorder results from the online, collaborative encyclopedia to have a higher rank than other results, the machine-learning system might infer that results from the online, collaborative encyclopedia should be ranked highly for all queries, or perhaps for other queries that are deemed similar.

In one embodiment of the present invention, the system extrapolates preference rankings for the user from the preference data derived from reorderings, and then uses these preference rankings to perform a user-directed, personalized search. During this process, the system can maintain state on a per-user and/or per-query basis, and, based on the user input, can infer that the user is seeking a particular interpretation of the search results and that the user has a preference for a certain type of search result. The system attempts to preserve partial orderings, but also infers from the results that were not reordered that there may be a better result ordering that is more consistent with the user's desired results. For instance, after a user reorders a first set of results, the system may change characteristics (such as the ranking or ordering) for a second set of results, based on the preferences derived from the reordering of the first set of results. By providing customized dynamic reordering of user search results, the system allows users to subtly influence the type and ordering of results at a finer granularity than directly changing the query terms.

In one embodiment of the present invention, the system aggregates preference data derived from a set of user reorderings to change the preference rankings for search results. By aggregating user preferences across all users, the system can determine an ordering that satisfies the majority of users. For instance, the system may analyze correlations between signals based on user preferences, in order to identify and generalize properties of web pages that indicate more highly-desirable search results for users.

Note that the system may weigh preferences differently for a given reordering. For instance, preference data for the reordering may be applied in the scope of a single query and/or single user, or may be extrapolated to: all queries for a user; all users for the same query; or all users for all queries.

In one embodiment of the present invention, the web browser 114 sends back reordering information to a server, such as the search engine 112 and/or the data center 108. For instance, the system can send back an "insert" event that specifies the search result that was moved, as well as the destination for the search result. The server can then start with the set of initial results and play back the events to determine partial orderings.

In one embodiment of the present invention, the ability to reorder search results can be an invisible user interface feature. This technique does not add additional fields to the list of search results, but instead adds additional capabilities to an existing display of search results. Users who are aware of the feature and wish to give feedback via reordering can do so, while the system does not add any additional cost or overhead to users who are unaware of the feature and/or do not want to use the feature. Alternatively, the ability to reorder search results can also be included as a visible user interface feature, in order to make the feature more easily discoverable by prospective users.

Although the present invention is described in the context of ranking web pages, note that the technique is not limited to web pages. In general, the present invention can be applied to many different ranking domains, such as images, documents, products, advertisements, video clips, audio clips and any other items that users can compare.

Note that the present invention gathers preference data in a manner that is not under authorial control, and is hence less vulnerable to "spamming" techniques. Unlike techniques that rank results based on properties under the control of page authors (e.g., the latest update time, the location of search terms in the document, or the back-links for linked documents), the technique described in the present invention collects preferences from users directly. This provides a more direct measurement of the quality of the page, and may allow the search engine to return results in an order that more closely matches the collective opinion of users, rather than page authors.

In summary, one embodiment of the present invention provides a system that allows users to reorder search results, and then gathers user preference data based on user reordering of search results. Gathering such preference data directly from users provides a clearer set of preferences than other approaches, such as predicting user preferences based on the content of selected pages. Statistics gathered from such reorderings can be used to improve the search process and the quality of search results.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    gathering, by a device, user preference data for each user of a plurality of users by:

receiving, by the device, a first search query submitted by each user;
providing, by the device and for presentation to each user, a plurality of search results based on the first search query, each of the plurality of search results being associated with a rank, the plurality of search results being presented according to the associated ranks;
receiving, by the device, an indication from each user indicating a change in the rank of a particular search result, in the plurality of search results, from an initial rank to a new rank;
assigning, by the device, first user preference data to the particular search result, the first user preference data reflecting the change in the rank of the particular search result;
assigning, by the device, second user preference data to a first search result, in the plurality of search results, that is associated with a first rank that is greater than the new rank associated with the particular search result, the first search result being different than the particular search result and the second user preference data indicating a preference for the first search result over the particular search result; and
assigning, by the device, third user preference data to a second search result, in the plurality of search results, that is associated with a second rank that is less than the new rank associated with the particular search result and less than the first rank associated with the first search result, the second search result being different than the particular search result and being different than the first search result and the third user preference data indicating a preference for the particular search result over the second search result and implying a preference for the first search result over the second search result;
storing, by the device, the gathered user preference data for each user of the plurality of users;
aggregating, by the device, the stored user preference data, for each user of the plurality of users to determine one or more aggregate user preferences;
receiving, by the device, a second search query; and
ranking, by the device, one or more search results, relevant to the second search query, according to the one or more aggregate user preferences.

2. The method of claim 1, where the change in the rank for the particular search result defines a partial ordering for the plurality of search results.

3. The method of claim 1,
where the indication from each user indicating the change in the rank of the particular search result is based on a command from each user to change a position of the particular search result in a ranked list of the plurality of search results.

4. The method of claim 1, where the method further comprises:
dynamically reordering, by the device, the rank of the particular search result based on the indication from each user.

5. A computer-readable storage medium storing instructions that when executed by a computer cause the computer to perform a method, the method comprising:
gathering user preference data for each user of a plurality of users, the one or more instructions to gather user preference data including the gathering including:
receiving a first search query submitted by each user;
providing, for presentation to each user, a plurality of search results based on the first search query, each of the plurality of search results being associated with a rank, the plurality of search results being presented according to the associated ranks;
receiving an indication from each user indicating a change in the rank of a particular search result in the plurality of search results, from an initial rank to a new rank;
assigning first user preference data to the particular search result, the first user preference data reflecting the change in the rank of the particular search result;
assigning second user preference data to a first search result, in the plurality of search results, that is associated with a first rank that is greater than the new rank associated with the particular search result, the first search result being different than the particular search result and the second user preference data indicating a preference for the first search result over the particular search result; and
assigning third user preference data to a second search result, in the plurality of search results, that is associated with a second rank that is less than the new rank associated with the particular search result and less than the first rank associated with the first search result, the second search result being different than the particular search result and being different than the first search result and the third user preference data indicating a preference for the particular search result over the second search result and implying a preference for the first search result over the second search result;
storing the gathered user preference data for each user of the plurality of users;
aggregating the stored user preference, for each user of the plurality of users, to determine one or more aggregate user preferences;
receiving a second search query; and
ranking one or more search results, relevant to the second search query, according to the one or more aggregate user preferences.

6. The computer-readable storage medium of claim 5, where the change in the rank for the particular search result defines a partial ordering for the plurality of search results.

7. The computer-readable storage medium of claim 5, where the method further comprises:
receiving the indication, from each user indicating the change in the rank of the particular search result, based on a command from each user to change a position of the particular search result in a ranked list of the plurality of search results.

8. The computer-readable storage medium of claim 5, where the method further comprises:
dynamically reordering the rank of the particular search result based on the indication from each user.

9. A system comprising:
a memory to store instructions; and
a processor to execute the instructions to:
gather user preference data for each user of a plurality of users, when gathering the user preference data, the processor is further to:
receive a first search query submitted by each user;
provide, for presentation to each user, a plurality of search results based on the first search query, each of the plurality of search results being associated with a rank, the plurality of search results being presented according to the associated ranks;

receive an indication from each user indicating a change in the rank of a particular search result in the plurality of search results, from an initial rank to a new rank;

assign first user preference data to the particular search result, the first user preference data reflecting the change in the rank of the particular search result;

assign second user preference data to a first search result, in the plurality of search results, that is associated with a first rank that is greater than the new rank associated with the particular search result, the first search result being different than the particular search result and the second user preference data indicating a preference for the first search result over the particular search result; and assign third user preference data to a second search result, in the plurality of search results, that is associated with a second rank that is less than the new rank associated with the particular search result and less than the first rank associated with the first search result, the second search result being different than the particular search result and being different than the first search result and the third user preference data indicating a preference for the particular search result over the second search result and implying a preference for the first search result over the second search result;

store the gathered user preference data for each user of the plurality of users;

aggregate the stored user preference data, for each user of the plurality of users, to determine one or more aggregate user preferences;

receive a second search query; and rank one or more search results, relevant to the second search query, according to the one or more aggregate user preferences.

10. The system of claim 9, where the change in the rank for the particular search result defines a partial ordering for the plurality of search results.

11. The system of claim 9, where the indication from each user indicating the change in the rank of the particular search result is based on a command from each user to change a position of the particular search result in a ranked list of the plurality of search results.

12. The system of claim 9, where the processor is further to:
dynamically reorder the rank of the particular search result based on the indication from each user.

13. The system of claim 9, where the processor is further to:
receive an indication from each user indicating a change in the rank of an additional search result, in the plurality of search results, from an initial rank to a new rank, the additional search result being different than the particular search result.

14. The system of claim 13, where the processor is further to:
receive an indication from each user indicating a change in the rank of another search result, in the plurality of search results, from an initial rank to a new rank, the other search result being different than the particular search result and is different than the additional search result.

15. The system of claim 9, where the plurality of search results correspond to at least one of:
web pages;
images;
documents;
advertisements;
video clips; or
audio clips.

16. The method of claim 1, further comprising:
receiving, by the device, an indication from each user indicating a change in the rank of an additional search result, in the plurality of search results, from an initial rank to a new rank, the additional search result being different than the particular search result.

17. The method of claim 16, further comprising:
receiving an indication from each user indicating a change in the rank of another search result, in the plurality of search results, from an initial rank to a new rank, the other search result being different than the particular search result and being different than the additional search result.

18. The method of claim 1, where the plurality of search results correspond to at least one of:
web pages;
images;
documents;
advertisements;
video clips; or
audio clips.

19. The medium of claim 5, further comprising:
one or more instructions to receive an indication from each user indicating a change in the rank of an additional search result, in the plurality of search results, from an initial rank to a new rank, the additional search result being different than the particular search result.

20. The medium of claim 19, further comprising:
one or more instructions to receive an indication from each user indicating a change in the rank of another search result, in the plurality of search results, from an initial rank to a new rank, the other search result being different than the particular search result and being different than the additional search result.

* * * * *